United States Patent [19]
Alimpich et al.

[11] Patent Number: 5,774,119
[45] Date of Patent: Jun. 30, 1998

[54] GRAPHICAL INTERFACE METHOD, APPARATUS AND APPLICATION FOR SELECTION OF TARGET OBJECT

[75] Inventors: Claudia Alimpich; Joan Stagaman Goddard, both of Boulder; Rachel Youngran Yang, Superior, all of Colo.

[73] Assignee: International Business Machines Corporation, Armonk, N.Y.

[21] Appl. No.: 932,507

[22] Filed: Sep. 18, 1997

Related U.S. Application Data

[63] Continuation of Ser. No. 696,750, Aug. 14, 1996, abandoned.

[51] Int. Cl.$^6$ .............................. G06F 15/00; G06F 3/14
[52] U.S. Cl. .......................... 345/340; 345/348; 345/975
[58] Field of Search ..................................... 345/340, 339, 345/346, 326, 341, 342, 343, 344, 345, 348, 347, 350, 351, 975

[56] References Cited

U.S. PATENT DOCUMENTS

| | | |
|---|---|---|
| 4,464,652 | 8/1984 | Lapson et al. ........................ 340/710 |
| 5,001,654 | 3/1991 | Winiger et al. ....................... 364/523 |
| 5,062,060 | 10/1991 | Kolnick ................................. 364/521 |
| 5,072,412 | 12/1991 | Henderson ........................... 395/159 |
| 5,095,512 | 3/1992 | Roberts et al. ....................... 382/56 |
| 5,117,372 | 5/1992 | Petty .................................... 395/161 |
| 5,119,476 | 6/1992 | Texier .................................. 395/157 |
| 5,121,477 | 6/1992 | Koopmans et al. ................. 395/156 |
| 5,140,677 | 8/1992 | Fleming et al. ..................... 395/159 |
| 5,140,678 | 8/1992 | Torres .................................. 395/159 |
| 5,164,911 | 11/1992 | Juran et al. .......................... 364/578 |
| 5,206,950 | 4/1993 | Geary et al. ......................... 395/600 |
| 5,208,907 | 5/1993 | Shelton et al. ...................... 395/149 |
| 5,228,123 | 7/1993 | Heckel ................................. 395/155 |
| 5,233,687 | 8/1993 | Henderson et al. ................. 395/158 |

(List continued on next page.)

FOREIGN PATENT DOCUMENTS

| | | |
|---|---|---|
| 2097540 | 12/1994 | Canada . |
| 0 587 394 A1 | 3/1994 | European Pat. Off. . |
| 0 622 728 A1 | 11/1994 | European Pat. Off. . |
| 4-361373 | 12/1992 | Japan . |
| 5-313845 | 11/1993 | Japan . |
| 6-4117 | 1/1994 | Japan . |
| 6-215095 | 8/1994 | Japan . |
| 7-129597 | 5/1995 | Japan . |

OTHER PUBLICATIONS

"Device Independent Graphics Using Dynamic Generic Operator Selection," *IBM Technical Disclosure Bulletin*, Apr. 1983, vol. 25, No. 11A, pp. 5477–5480.

"Error–Tolerant Dynamic Allocation of Command Processing Work Space," *IBM Technical Disclosure Bulletin*, Jun. 84, vol. 27, No. 1B, pp. 584–586.

"Means for Computing the Max of a Set of Variables Distributed Across Many Processors," *IBM Technical Disclosure Bulletin*, Sep. 1990, vol. 33, No. 4, pp. 8–12.

"Graphical User Interface for the Distributed System Namespace," *IBM Technical Disclosure Bulletin*, Jul. 1992, vol. 35, No. 2, pp. 335–336.

"Graphical Query System," *IBM Technical Disclosure Bulletin*, Nov. 1993, vol. 36, No. 11, pp. 615–616.

(List continued on next page.)

*Primary Examiner*—Raymond J. Bayerl
*Assistant Examiner*—Steven P. Sax
*Attorney, Agent, or Firm*—Jenkens & Gilchrist

[57] ABSTRACT

An application, method and apparatus is disclosed by which a user selects an object and then drags and drops the object onto a window containing multiple possible target objects. The system generates a selection window listing all of the possible target objects. The user then selects one or more of the possible target objects on which the selected object is to operate.

4 Claims, 5 Drawing Sheets

U.S. PATENT DOCUMENTS

| | | | |
|---|---|---|---|
| 5,247,651 | 9/1993 | Clarisse et al. | 395/500 |
| 5,249,265 | 9/1993 | Liang | 395/160 |
| 5,255,359 | 10/1993 | Ebbers et al. | 395/161 |
| 5,276,901 | 1/1994 | Howell et al. | 395/800 |
| 5,287,447 | 2/1994 | Miller et al. | 395/157 |
| 5,307,451 | 4/1994 | Clark | 395/127 |
| 5,315,703 | 5/1994 | Matheny et al. | 395/164 |
| 5,317,687 | 5/1994 | Torres | 395/159 |
| 5,317,730 | 5/1994 | Moore et al. | 395/600 |
| 5,367,619 | 11/1994 | Dipaolo et al. | 395/149 |
| 5,371,844 | 12/1994 | Andrew et al. | 395/155 |
| 5,377,317 | 12/1994 | Bates et al. | 395/157 |
| 5,388,255 | 2/1995 | Pytlik et al. | 395/600 |
| 5,394,521 | 2/1995 | Henderson et al. | 395/158 |
| 5,404,439 | 4/1995 | Moran et al. | 395/155 |
| 5,410,695 | 4/1995 | Frey et al. | 395/650 |
| 5,410,704 | 4/1995 | Norden-Paul et al. | 395/700 |
| 5,412,776 | 5/1995 | Bloomfield et al. | 395/160 |
| 5,414,806 | 5/1995 | Richards | 395/135 |
| 5,416,900 | 5/1995 | Blanchard et al. | 395/346 |
| 5,418,950 | 5/1995 | Li et al. | 395/600 |
| 5,428,554 | 6/1995 | Laskoski | 364/550 |
| 5,428,776 | 6/1995 | Rothfield | 395/600 |
| 5,438,659 | 8/1995 | Notess et al. | 395/155 |
| 5,450,545 | 9/1995 | Martin et al. | 395/700 |
| 5,454,071 | 9/1995 | Siverbrook et al. | 395/141 |
| 5,454,106 | 9/1995 | Burns et al. | 395/600 |
| 5,459,825 | 10/1995 | Anderson et al. | 395/133 |
| 5,459,832 | 10/1995 | Wolf et al. | 395/155 |
| 5,463,724 | 10/1995 | Anderson et al. | 395/148 |
| 5,473,745 | 12/1995 | Berry et al. | 395/157 |
| 5,479,599 | 12/1995 | Rockwell et al. | 395/155 |
| 5,481,666 | 1/1996 | Nguyen et al. | 395/159 |
| 5,483,651 | 1/1996 | Adams et al. | 395/600 |
| 5,487,141 | 1/1996 | Cain et al. | 395/135 |
| 5,491,795 | 2/1996 | Beaudet et al. | 395/159 |
| 5,497,454 | 3/1996 | Bates et al. | 395/158 |
| 5,497,484 | 3/1996 | Potter et al. | 395/600 |
| 5,544,302 | 8/1996 | Nguyen | 395/340 |
| 5,564,004 | 10/1996 | Grossman et al. | 395/348 |
| 5,568,604 | 10/1996 | Hansen | 395/340 |
| 5,572,726 | 11/1996 | Hasuo | 395/616 |

OTHER PUBLICATIONS

"Configuration Data Set Build Batch Program," *IBM Technical Disclosure Bulletin*, Nov. 1993, vol. 36, No. 11, p. 571.

Self–Contained Reusable Programmed Components, *IBM Technical Disclosure Bulletin*, Jul. 1995, vol. 38, No. 7, pp. 283–285.

"IBM Printing Systems Manager for AIX Overview," *International Business Machines Corporation*, Second Edition, Feb. 1996.

"Matching Three–Dimensional Objects Using a Relational Paradigm," *Pattern Recognition*, vol. 17, No. 4, pp. 385–405, 1984.

"A Multicolumn List–Box Container for OS/2," *Dr. Dobb's Journal*, May 1994, vol. 19, No. 5, pp. 90–94.

"IBM Printing Systems Manager for AIX Administrating," *International Business Machines Corporation*, 1995.

GRAPHICAL INTERFACE METHOD, APPARATUS AND APPLICATION FOR SELECTION OF TARGET OBJECT

This application is a continuation of application. Ser. No. 08/696,750, filed on Aug.14, 1996, which was abandoned upon the filing hereof.

BACKGROUND OF THE INVENTION AND STATE OF THE PRIOR ART

1. Field of the Invention

The present invention relates to a graphical user interface. More particularly, the invention relates to a method, apparatus, and application for selecting a target object from multiple objects.

2. Description of Related Art

In order to better understand the terms utilized in this patent application, a brief background definition section will be presented so that the reader will have a common understanding of the terms employed and associated with the present invention.

A "user interface" is a group of techniques and mechanisms that a person employs to interact with an object. The user interface is developed to fit the needs or requirements of the users who use the object. Commonly known user interfaces can include telephone push buttons or dials, or pushbuttons such as on a VCR or a television set remote. With a computer, many interfaces not only allow the user to communicate with the computer but also allow the computer to communicate with the user. These would include (1) command-line user interfaces (i.e., user remembered commands which he/she enters, e.g. "C:>DIR" in which "DIR" is a typical DOS command entered at the "C" prompt); (2) menu-driven user interfaces which present an organized set of choices for the user, and (3) graphical user interfaces, ("GUI") in which the user points to and interacts with elements of the interface that are visible, for example by a "mouse" controlled arrow or cursor.

An example of a GUI user interface is that which is offered by International Business Machines Corporation (IBM) under the name "Common User Access" ("CUA"). This GUI incorporates elements of object orientation (i.e., the user's focus is on objects and the concept of applications is hidden). Object orientation of the interfaces allow for an interconnection of the working environment in which each element, called an "object," can interact with every other object. The objects users require to perform their tasks and the objects used by the operating environment can work cooperatively in one seamless interface. With objected oriented programming using a GUI, the boundaries that distinguish applications from operating systems are no longer apparent or relevant to the user.

In connection with this patent application, an "object" means any visual component of a user interface that a user can work with as a unit, independent of other items, to perform a task. By way of example, a spreadsheet, one cell in a spreadsheet, a bar chart, one bar in a bar chart, a report, a paragraph in a report, a database, one record in a database, and a printer are all objects. Each object can be represented by one or more graphic images, called "icons," with which a user interacts, much as a user interacts with objects in the real world. (NOTE: In the real world, an object might be an item that a person requires to perform work. As an example, an architect's objects might include a scale, T-square, and a sharp pencil, while an accountant's objects might include a ledger and a calculator.) However, it is not required that an object always be represented by an icon, and not all interaction is accomplished by way of icons. For example, a user can interact with an object by opening a window that displays more information about the object and includes a variety of mechanisms for interacting with the object.

While classification of objects may follow many different definitions, each class of objects has a primary purpose that separates it from the other classes. A class may be looked at as a group of objects that have similar behavior and information structures. In addition, each of the objects enumerated and defined below may contain other objects. There are three primary classes of objects. Each is discussed below.

(1) Container Object: This object holds other objects. Its principal purpose is to provide the user with a way to hold or group related objects for easy access or retrieval. An operating system, e.g. OS/2® (a trademark of IBM Corporation) or Windows® (a trademark of Microsoft Corporation), typically provides a general-purpose container, for example a folder or a program group—that holds any type of object, including other containers. For example, imagine a program group (or folder) labeled "PRIVATE FOLDER-ICONS". In the program group are three folder icons labeled "REPORTS", "PORTFOLIO" and "LETTERS". By selecting with a mouse or other pointing device the icon "PORTFOLIO", another window may open showing three more icons labeled "OIL PAINTINGS", "WATERCOLORS", and "PORTRAITS". In turn, selecting any of those three icons may open additional windows with further icons representing further subdivisions, or cross-references (e.g., "CUSTOMERS").

(2) Data Objects: The principal purpose of a data object is to convey information. This information may be textual or graphical information or even audio or video information. For example, a business report displayed on the computer monitor may contain textual information concerning sales of "gadgets" over the past few years (text object) to all customers and also may contain a bar chart (graphic object) to pictorially depict, on the same monitor screen, the sales information.

(3) Device Objects: The principal purpose of a device object is to provide a communication vehicle between the computer and another physical or logical object. Many times the device object represents a physical object in the real world. For example, a mouse object or icon can represent the user's pointing device, and a modem object can represent the user's modem, or a printer object or icon can represent the user's printer. Other device objects are purely logical, e.g. an out-basket icon representing outgoing electronic mail; a wastebasket object or icon representing a way the user may "trash" or dispose of other objects.

As can be seen from the foregoing, a class of objects may be defined as a description of the common characteristics of several objects, or a template or model which represents how the objects contained in the class are structured. While there are further ways in which to define objects and classes of objects, typically each class of objects will include similar attributes, the values of which the user will alter, modify, replace or remove from time to time. (For a more complete discussion of objects, attributes, object oriented interfaces and related topics see "Object Oriented Interface Design: IBM Common User Access" (published by Que, ISBN 1-56529-170-0).

In a graphical user interface it is common for a single window to contain representations of more than one object. The representations typically are in the form of icons. In this application the terms "object" and "icon" are used interchangeably unless otherwise noted. For example, the window may contain objects that are "sub-objects" or "children" of a "parent" object. Alternatively, the window can represent more than one parent object, and contain "child" objects for each parent object.

A user might take an action that is ambiguous as to which object is intended. More particularly, there might be functions defined such that when an object is dragged and dropped into the window, an action is to occur that requires selection of a specific object. If the window represents multiple objects, further action is needed to clarify which object is intended by the user.

As an example, suppose the user drags and drops a logical printer template onto a logical printer window that represents more than one printer queue. The system is equipped to assign one or more queues to the new logical printer, but needs to know which queue is intended to be assigned to the printer.

Current graphical user interface architectures do not address this problem.

SUMMARY OF THE INVENTION

In view of the above, it is a principal object of the present invention to provide a method, application and apparatus to select a designated object in a window representing multiple objects Another object of the present invention is to permit a user the freedom to act ambiguously and to build into the system a querying mechanism to determine what the user intends.

Still another object of the present invention is to provide an application which may be employed in a number of different computers, may be transported between different computers, and may be loaded into various computer environments.

The invention is carried out in the following environment. The computer system has at least a visual operator interface, an operating system for operating applications within the computer system, and memory for storing at least part, preferably all, of an application therein. The present invention is a method, apparatus, and application by which a user, after taking an action pertaining to one of multiple objects in a window representing multiple objects, is presented with a dialog box of objects from which to choose the intended object. Once the system knows which object was intended, the system performs as the user instructed when the user dropped the object into the window.

Other objects of the invention and a more complete understanding of the invention may be had by referring to the following description taken in conjunction with the accompanying drawings.

DESCRIPTION OF THE ILLUSTRATIVE EMBODIMENTS

Figure 1:
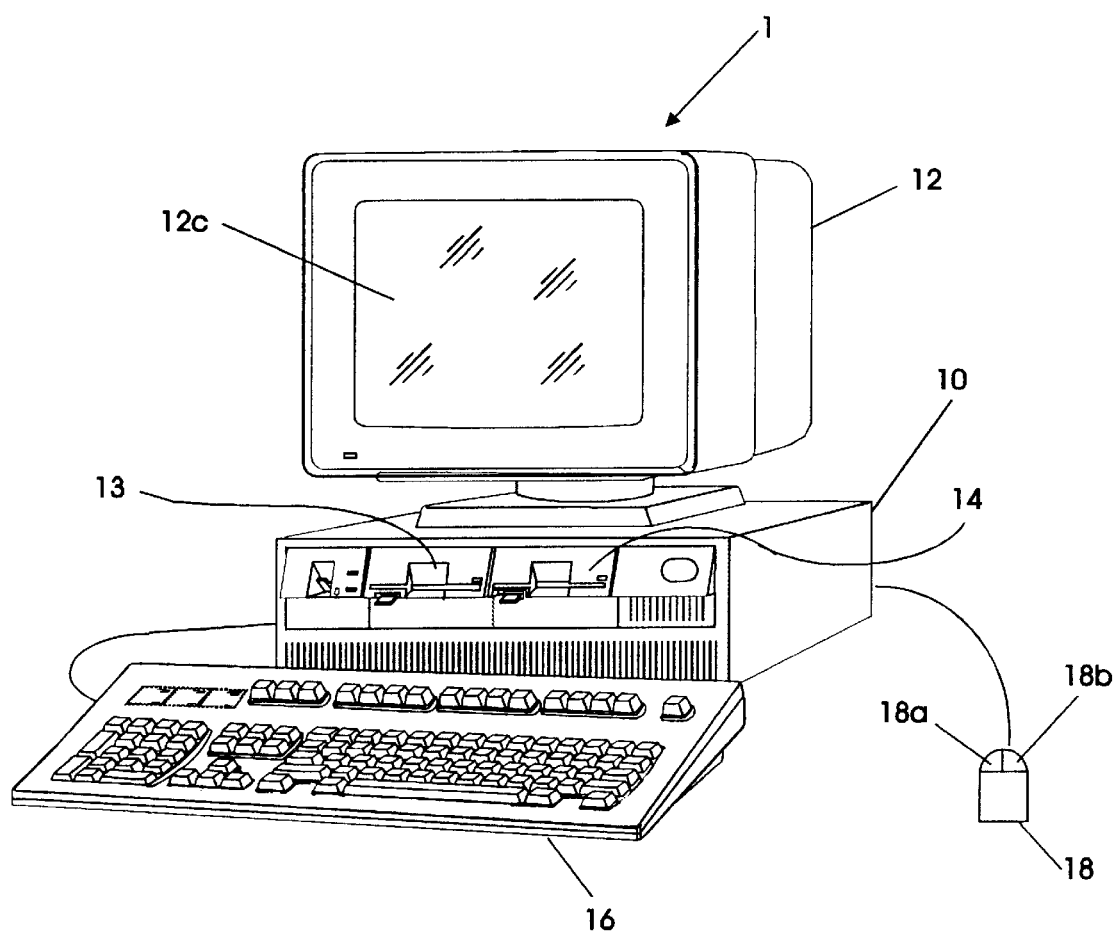
FIG. 1 illustrates a typical desktop computer system which may be employed to practice the novel method and application of the present invention.
Figure 2:
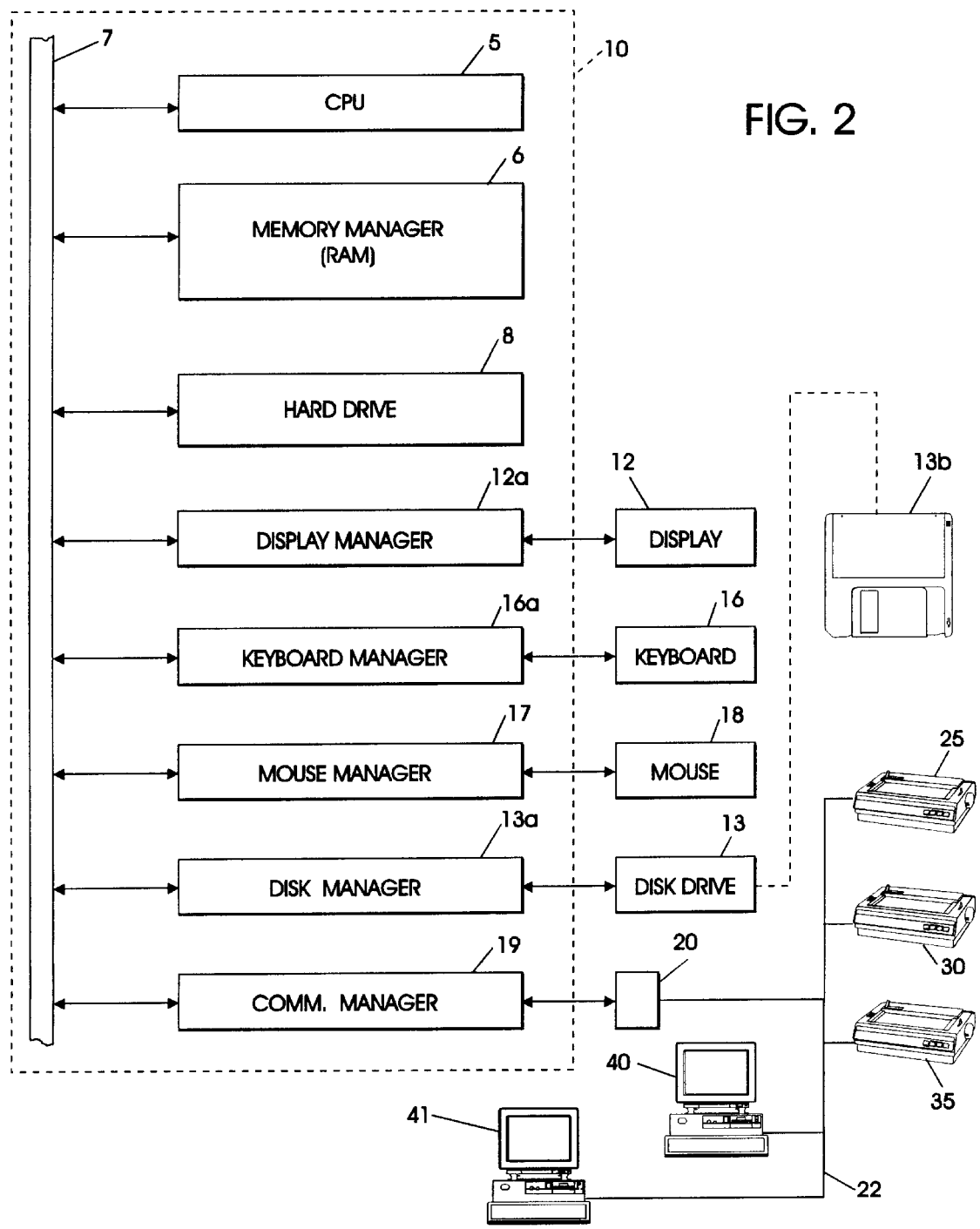
FIG. 2 is a block diagram illustrating a sample configuration of the computer system shown in FIG. 1.

Turning now to the drawings, and especially FIGS. 1 and 2, FIG. 1 diagrammatically shows a computer system 1 which may be connected to a Local Area Network system (LAN 20) as shown in FIG. 2.

As shown in FIG. 1, the computer system 1 comprises a main chassis 10, a display means or monitor 12, a connected keyboard 16 and a pointing device, in the present instance a mouse 18 which is operator controlled to move a pointer cursor 12b (shown in FIG. 3) on the display or monitor screen 12c. As shown in FIG. 2, the chassis 10 includes a central processing unit, or "CPU"5, a memory manager and associated random access memory, or "RAM"6, a fixed disk or hard drive 8 (which may include its associated disk controller), a display manager 12a which is connected externally to the chassis 10 of the display 12; a keyboard manager 16a, which through flexible cable (not shown) is connected to the keyboard 16; a mouse manager 17 (which in some instances may form part of the display manager 12a, and may be in the form of a software driver) for reading the motion of the mouse 18 and its control mouse buttons (MB) 18a and 18b, shown in FIG. 1. A disk manager or controller 13a which controls the action of the disk drive 13 (and an optional drive such as a magneto-optical or CD ROM drive 14) shown in FIG. 1, rounds out most of the major elements of the computer system 1.

The pointer element or cursor 12b can be moved over the display screen 12c by movement of the mouse 18. The mouse buttons (MB) 18a and 18b give commands to the operating system, usually through a software mouse driver provided by the mouse manufacturer. With the first mouse button (MB) 18a the operator can select an object indicated on the display screen 12c using the pointer or cursor 12b, i.e., signify that an action subsequently to be performed is to be carried out on the data represented by the indicated object on the display screen 12c. The system normally gives some visual feedback to the operator to indicate the object selected, such as a change in color, or a blocking of the icon. The second mouse button (MB) 18b may be a menu button, if desired. Conventionally, when the operator presses button 18b, a selection menu or dialog with system commands will appear on the display screen 12c. The operator may select an object or menu item from the selection menu or input information into the dialog box as appropriate using the cursor 12b and the first mouse button (MB) 18a. Some menu items, if selected, may call up another menu or submenu for the operator to continue the selection process.

The use of a mouse and selection menus is well known in the art, for example U.S. Pat. No. 4,464,652 to Lapson et al. describes a selection menu of the pull-down type in combination with a mouse. It should be recognized, of course, that other cursor pointing devices may be employed, for example a joystick, ball and socket, or cursor keys on the keyboard.

The foregoing devices (and software drivers therefore) within the chassis 10 communicate with one another via a bus 7. To round out the computer system 1, an operating system (not shown) must be employed. If the computer system is a typical IBM-based system, the operating system may be DOSbased and include a GUI interface such as contained in OS/2® or WINDOWS®, or other operating system of choice. If the computer system is based upon RISC (reduced instruction set computer) architecture, then the operating system employed may be, in the instance of an IBM-based RISC architectured System/6000®, AIX. Alternatively, if the computer system 1 is a large host computer, such as a an IBM 3090, it may be running an operating system such as MVS or VM. This operating system normally includes a print service facility such as IBM's PSF, which is a system-wide resource manager, which takes a "job" which has been formatted for a particular printer, and sends certain files, such as fonts, special commands and the like to the printer before sending the file to be printed.

In the illustrated instance, the computer system 1 includes an I/O (Input/Output) manager or communications manager 19 (shown in FIG. 2) which serves to link the computer system for communications with the outside world such as to a systems printer, a modem or a LAN controller ( such as a Token ring or ETHERNET or even through a modem employing SDLC) such as shown at 20 in FIG. 2. The LAN controller may be incorporated inside the computer system 1 or located externally as shown diagrammatically in FIG. 2, as desired. The LAN controller 20 may connect to other computer systems 40 and 41 as well as to other printers such as printers 25, 30 and 35 by communications cable 22 and the like. However the method and application of the present invention works equally well with multiple objects serviced by a single computer system or with multiple objects such as printers or servers which service the computer system or systems.

Assume that the operator or system user desires to take an action that requires selecting one of multiple objects in a window. The user, for example, may desire to create a new logical printer. The user selects, drags and drops a logical printer template icon onto a window that represents multiple printer queues. The user does not indicate, merely by dragging and dropping a logical printer template icon onto the window, to which printer queue the new logical printer is to be assigned.

Figure 3:
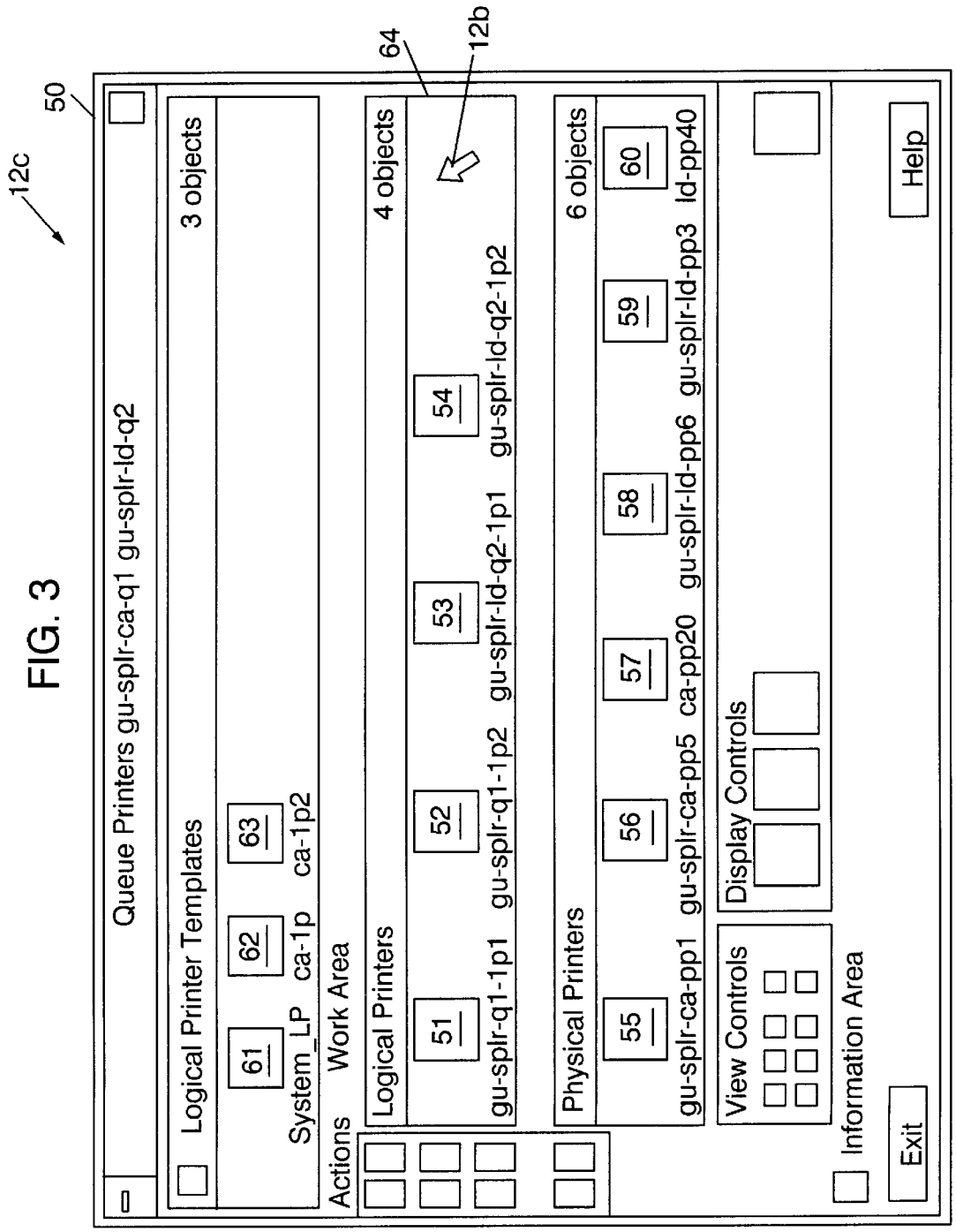
FIG. 3 is a typical screen display showing functions and multiple objects on which each function can act.

Referring now to FIG. 3, the display screen 12c of the monitor 12 is shown with a program manager dialog 50 thereon which is similar to the conventional GUI interfaces employed, for example, with the operating systems currently widely used, such as, WINDOWS® or OS/2®. As illustrated, in the window 50 the window represents a plurality of printer queues 51–60. When the user desires to create a new logical printer and assign it a printer queue, the mouse 18 is moved until the pointer 12b is in contact with the pane 64. Assume the user selects logical printer template 62 by depressing the left mouse button 18b and then holds down button 18b while dragging logical printer template 62 to the pane 64 which represents queues 51–54. The user then releases the mouse button 18b and "drops" the logical printer 62 into the pane 64. By such an action the user has indicated that at least one of the queues 51–54 is to be assigned to printer 62. However, it is unclear which queue should be so assigned. The present invention provides a means for the system to determine which of the printer queues 51–54 should be assigned to printer 62.

Figure 4:
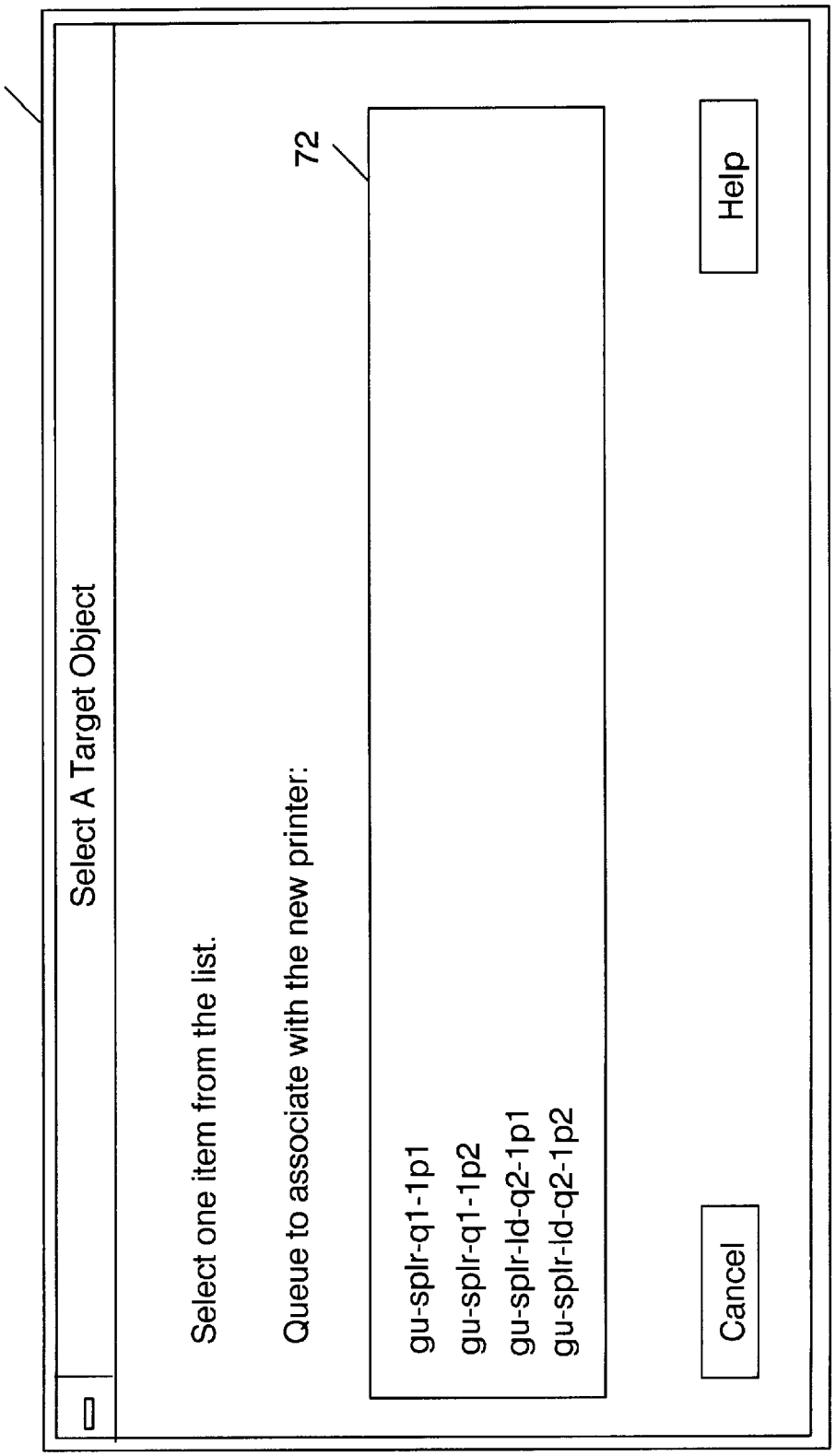
FIG. 4 illustrates the Select a Target object dialog box from which the user indicates on which of the one or more objects the function should act.

As shown in FIG. 4, once the user "drags and drops" printer 62 into pane 64, a "Select a Target Object" dialog window 70 appears. The window 70 contains instructions to the user. In this example, the user is instructed to select the desired printer queue from the dialog box 72 that lists each of the printer queues 51–54. The user typically will select the desired printer queue by moving the cursor to the desired printer queue and then depressing the mouse button 18b. The system will indicate the selection by means of a dashed box, a color change, or some other mechanism (not shown).

Once the appropriate queue is selected, the system will assign that queue to printer 62.

Figure 5:
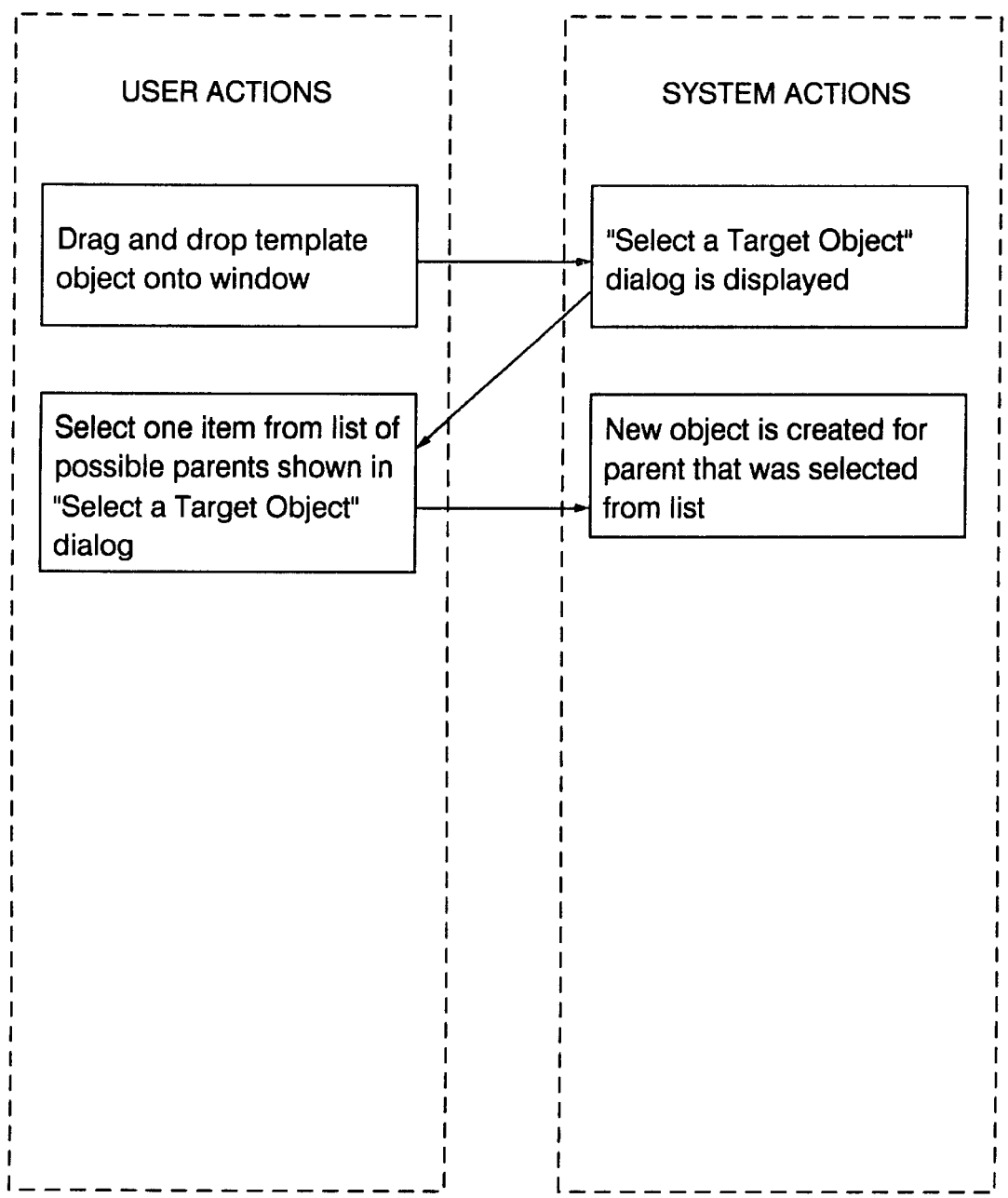
FIG. 5 is a flow chart illustrating the present invention.

FIG. 5 is a flowchart showing the method of the present invention.

The present invention thus accommodates ambiguous actions by users. The user has the freedom to drop the printer 62 anywhere in the pane 64. The system determines the information it needs to carry out the user's desires by querying the user in the Select a Target Object window 70.

Once the system has the information it needs, the system carries out the task assigned by the user in accordance with the dropped object.

Although the invention has been described with a certain degree of particularity, it should be recognized that elements thereof may be altered by persons skilled in the art without departing from the spirit and scope of the invention. The invention is limited only by the following claims and their equivalents.

What is claimed is:

1. An application for selection of one or more target objects as controlled by a computer system having at least a visual operator interface, an operating system for controlling the operation of program applications within the computer system, and memory for storing a program application therein, said application comprising:

means for selecting an object;

means for ambiguously dragging and dropping the selected object onto a window containing multiple possible target objects, where the selected object is intended to operate on at least one of the possible target objects, but the selected object is not dropped directly onto one or more of the possible target objects and the computer system is not sure which of the possible target objects is intended to be selected;

means for generating a selection window listing all of the possible target objects in response to an ambiguous drop; and means for selecting in the selection window the one or more possible target objects on which the selected object is to act.

2. The application of claim 1 further comprising:

means for terminating operation of the selected object by canceling the selection window.

3. A method for selection of one or more target objects as controlled by a computer system having at least a visual operator interface, an operating system for controlling the operation of program applications within the computer system, and memory for storing a program application therein, said method comprising the steps of:

selecting an object;

ambiguously dragging and dropping the selected object onto a window containing multiple possible target objects, where the selected object is intended to operate on at least one of the possible target objects, but the selected object is not dropped directly onto one or more of the possible target objects and the computer system is not sure which of the possible target objects is intended to be selected;

generating a selection window listing all of the possible target objects in response to an ambiguous drop; and selecting in the selection window the one or more possible target objects on which the selected object is to act.

4. The method of claim 3 for selection of a target object as controlled by a computer system having at least a visual operator interface, an operating system for controlling the operation of program applications within the computer system, and memory for storing a program application therein, said method further comprising:

terminating operation of the selected object by canceling the selection window.

* * * * *